United States Patent
Cheal et al.

(10) Patent No.: US 8,240,701 B2
(45) Date of Patent: Aug. 14, 2012

(54) MOUNTING ASSEMBLIES WITH WRAPPERS FOR INFLATABLE CURTAIN AIRBAGS

(75) Inventors: Blake L. Cheal, Perry, UT (US); Kurt L. Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 206 days.

(21) Appl. No.: 12/555,486

(22) Filed: Sep. 8, 2009

(65) Prior Publication Data

US 2011/0057422 A1    Mar. 10, 2011

(51) Int. Cl.
*B60R 21/201* (2011.01)
*B60R 21/213* (2011.01)

(52) U.S. Cl. ................... 280/728.2; 280/730.2
(58) Field of Classification Search ......... 280/728.2, 280/730.2; 24/457, 458, 191, 171; 248/95, 248/166, 909, 301, 304, 305, 306, 308
See application file for complete search history.

(56) References Cited

U.S. PATENT DOCUMENTS

| | | | |
|---|---|---|---|
| 5,581,850 A * | 12/1996 | Acker | 24/16 PB |
| 5,746,690 A | 5/1998 | Humbarger et al. | |
| 5,899,486 A | 5/1999 | Ibe | |
| 5,944,342 A | 8/1999 | White, Jr. et al. | |
| 6,073,961 A | 6/2000 | Bailey et al. | |
| 6,099,026 A | 8/2000 | Ando et al. | |
| 6,209,907 B1 | 4/2001 | Fischer | |
| 6,223,389 B1 | 5/2001 | Walsh et al. | |
| 6,305,707 B1 | 10/2001 | Ishiyama et al. | |
| 6,412,810 B1 | 7/2002 | Wipasuramonton et al. | |
| 6,415,560 B1 | 7/2002 | Rinderer | |
| 6,550,809 B1 | 4/2003 | Masuda et al. | |
| 6,626,456 B2 | 9/2003 | Terbu et al. | |
| 6,672,612 B2 | 1/2004 | Sauer et al. | |
| 6,705,635 B2 | 3/2004 | Hoeft et al. | |
| 6,743,162 B2 | 6/2004 | Hieber et al. | |
| 6,749,220 B1 | 6/2004 | Wipasuramonton et al. | |
| 6,758,490 B2 | 7/2004 | Hoeft et al. | |
| 6,796,576 B2 | 9/2004 | Aoki et al. | |
| 6,851,702 B2 | 2/2005 | Henderson et al. | |
| 6,889,999 B2 | 5/2005 | Dominissini et al. | |

(Continued)

FOREIGN PATENT DOCUMENTS

DE   10 2005 012 845   9/2006

(Continued)

OTHER PUBLICATIONS

Office Action issued Apr. 16, 2007 in co-pending U.S. Appl. No. 11/068,662, now U.S. Patent No. 7,357,408.

(Continued)

*Primary Examiner* — Joseph Rocca
(74) *Attorney, Agent, or Firm* — Sally J. Brown; Stoel Rives LLP

(57) ABSTRACT

Mounting assemblies can be used to retain an inflatable airbag cushion in a packaged configuration and attach the cushion to a vehicle structure. The mounting assemblies can have a mounting bracket and a wrapping member. The assemblies can also have a connecting member that connects the mounting bracket to the wrapper. The mounting bracket is attached to a vehicle structure and the wrapping member wraps and retains the cushion after it has been rolled and/or folded. During airbag deployment, the wrapping member releases the cushion so that it can be fully inflated and the mounting structure continues to anchor the cushion to the vehicle structure.

27 Claims, 9 Drawing Sheets

U.S. PATENT DOCUMENTS

| | | | |
|---|---|---|---|
| 6,902,187 B2 | 6/2005 | Sonnenberg | |
| 6,991,256 B2 | 1/2006 | Henderson et al. | |
| 7,083,188 B2 | 8/2006 | Henderson et al. | |
| 7,097,200 B2 | 8/2006 | Wold | |
| 7,121,579 B2 | 10/2006 | Ochiai et al. | |
| 7,125,037 B2 | 10/2006 | Tallerico et al. | |
| 7,159,896 B2 | 1/2007 | Ochiai et al. | |
| 7,163,231 B2 | 1/2007 | Kumagai | |
| 7,172,212 B2 | 2/2007 | Aoki et al. | |
| 7,261,682 B2 | 8/2007 | Crookston et al. | |
| 7,328,911 B2 | 2/2008 | Chapman | |
| 7,344,154 B2 | 3/2008 | Yokoyama et al. | |
| 7,357,408 B2 | 4/2008 | Hall et al. | |
| 7,407,182 B2 | 8/2008 | Aoki et al. | |
| 7,478,826 B2 | 1/2009 | Soderquist et al. | |
| 7,547,038 B2 | 6/2009 | Coleman | |
| 7,568,730 B2 | 8/2009 | Kwon | |
| 7,641,220 B2 | 1/2010 | Visker et al. | |
| 7,731,224 B2 | 6/2010 | Enriquez et al. | |
| 7,823,914 B2 | 11/2010 | Cheal et al. | |
| 7,980,585 B2 | 7/2011 | Cheal | |
| 8,006,998 B2 | 8/2011 | Hatfield et al. | |
| 8,056,924 B2 | 11/2011 | Hatfield et al. | |
| 8,091,918 B2 | 1/2012 | Mitchell et al. | |
| 2002/0158450 A1 | 10/2002 | Hoeft et al. | |
| 2002/0195803 A1 | 12/2002 | Terbu et al. | |
| 2003/0006589 A1 | 1/2003 | Aoki et al. | |
| 2003/0042712 A1 | 3/2003 | Henderson et al. | |
| 2003/0184057 A1 | 10/2003 | Kumagai | |
| 2004/0000775 A1 | 1/2004 | Henderson et al. | |
| 2005/0010335 A1 | 1/2005 | Kettenacker et al. | |
| 2005/0029778 A1 | 2/2005 | Weber et al. | |
| 2005/0046154 A1 | 3/2005 | Rhea et al. | |
| 2005/0104335 A1 | 5/2005 | Henderson et al. | |
| 2005/0110256 A1 | 5/2005 | Crookston et al. | |
| 2005/0121887 A1 | 6/2005 | Inoue et al. | |
| 2005/0179238 A1 | 8/2005 | Kippschull et al. | |
| 2005/0206138 A1 | 9/2005 | Breuninger et al. | |
| 2005/0236815 A1 | 10/2005 | Kismir et al. | |
| 2006/0043703 A1 | 3/2006 | Enriquez | |
| 2006/0119084 A1 | 6/2006 | Coon et al. | |
| 2006/0138762 A1 | 6/2006 | Jang | |
| 2006/0192368 A1 | 8/2006 | Hall et al. | |
| 2006/0197316 A1 | 9/2006 | Watanabe | |
| 2006/0237957 A1 | 10/2006 | Woydick | |
| 2007/0003390 A1 | 1/2007 | Kawai | |
| 2007/0019891 A1 | 1/2007 | Daniel | |
| 2007/0024031 A1 | 2/2007 | Coleman | |
| 2007/0090630 A1 | 4/2007 | Wilmot | |
| 2007/0090634 A1 | 4/2007 | Jang et al. | |
| 2007/0126211 A1 | 6/2007 | Moerke et al. | |
| 2007/0216139 A1 | 9/2007 | Mazanek et al. | |
| 2007/0296189 A1 | 12/2007 | Berntsson et al. | |
| 2008/0061535 A1 | 3/2008 | Everard et al. | |
| 2008/0197610 A1 | 8/2008 | Downey | |
| 2008/0217892 A1 | 9/2008 | Maripudi et al. | |
| 2008/0217896 A1 | 9/2008 | Visker | |
| 2008/0224457 A1 | 9/2008 | Brough et al. | |
| 2008/0284142 A1 | 11/2008 | Cheal et al. | |
| 2010/0327564 A1 | 12/2010 | Cheal | |
| 2011/0018245 A1 | 1/2011 | Hatfield et al. | |
| 2011/0042923 A1 | 2/2011 | Hatfield et al. | |
| 2011/0057422 A1 | 3/2011 | Cheal et al. | |
| 2011/0175333 A1* | 7/2011 | Mitchell et al. | 280/728.2 |

FOREIGN PATENT DOCUMENTS

| | | |
|---|---|---|
| GB | 2309942 | 8/1997 |
| WO | WO-2004/087471 | 10/2004 |
| WO | WO 2006/097309 | 9/2006 |
| WO | WO 2007/018650 | 2/2007 |
| WO | WO 2008/109396 | 9/2008 |
| WO | WO 2008/144121 | 11/2008 |
| WO | WO-2011/022614 | 2/2011 |
| WO | WO-2011/031584 | 3/2011 |
| WO | WO 2011/090994 | 7/2011 |

OTHER PUBLICATIONS

Amendment and Response to Office Action filed Oct. 16, 2007 in U.S. Appl. No. 11/068,662, now U.S. Patent No. 7,357,408.
Notice of Allowance and Fee(s) Due issued Dec. 4, 2007 in U.S. Appl. No. 11/068,662, now U.S. Patent No. 7,357,408.
Office Action issued Mar. 26, 2008 in U.S. Appl. No. 11/192,258, now U.S. Patent No. 7,547,038.
Response to Requirement for Election filed May 23, 2008 in U.S. Appl. No. 11/192,258, now U.S. Patent No. 7,547,038.
Office Action issued Aug. 8, 2008 in U.S. Appl. No. 11/192,258, now U.S. Patent No. 7,547,038.
Amendment and Response to Office Action filed Nov. 25, 2008 in U.S. Appl. No. 11/192,258, now U.S. Patent No. 7,547,038.
Notice of Non-Compliant Amendment issued Dec. 8, 2008 in U.S. Appl. No. 11/192,258, now U.S. Patent No. 7,547,038.
Interview Summary issued Dec. 9, 2008 in U.S. Patent Application No. 11/192,258, now U.S. Patent No. 7,547,038.
Response to Notice of Non-Compliant Amendment filed Dec. 10, 2008 in U.S. Appl. No. 11/192,258, now U.S. Patent No. 7,547,038.
Notice of Allowance and Fee(s) Due issued Dec. 24, 2008 in U.S. Appl. No. 11/192,258, now U.S. Patent No. 7,547,038.
Summary of Interview filed Jan. 5, 2009 in U.S. Appl. No. 11/192,258, now U.S. Patent No. 7,547,038.
Request for Continued Examination filed Jan. 21, 2009 in U.S. Appl. No. 11/192,258, now U.S. Patent No. 7,547,038.
Notice of Allowance and Fee(s) Due issued Feb. 27, 2009 in U.S. Appl. No. 11/192,258, now U.S. Patent No. 7,547,038.
Office Action issued Feb. 24, 2009 in U.S. Appl. No. 11/714,037, now U.S. Patent No. 7,641,220.
Amendment and Response to Office Action issued Aug. 24, 2009 in U.S. Appl. No. 11/714,037, now U.S. Patent No. 7,641,220.
Notice of Allowance and Fee(s) Due issued Sep. 16, 2009 in U.S. Appl. No. 11/714,037, now U.S. Patent No. 7,641,220.
Office Action issued May 4, 2009 in co-pending U.S. Appl. No. 11/803,238, now U.S. Publication No. US-2008/0284142.
Amendment and Response to Office Action filed Nov. 4, 2009 in co-pending U.S. Appl. No. 11/803,238, now U.S. Publication No. US-2008/0284142.
Office Action issued Mar. 10, 2010 in co-pending U.S. Appl. No. 11/803,238, now U.S. Publication No. US-2008/0284142.
Amendment and Response to Office Action filed Jun. 4, 2010 in co-pending U.S. Appl. No. 11/803,238, now U.S. Publication No. US-2008/0284142.
Notice of Allowance and Fee(s) Due issued Jul. 9, 2010 in co-pending U.S. Appl. No. 11/803,238, now U.S. Publication No. US-2008/0284142.
Request for Continued Examination filed Aug. 9, 2010 in co-pending U.S. Appl. No. 11/803,238, now U.S. Publication No. US 2008/0284142.
Notice of Allowance issued Sep. 14, 2010 in co-pending U.S. Appl. No. 11/803,238, now U.S. Publication No. US 2008/0284142.
Restriction Requirement issued Aug. 11, 2010 in co-pending U.S. Appl. No. 12/544,952.
Amendment and Response to Requirement for Election of Species filed Oct. 11, 2010 in co-pending U.S. Appl. No. 12/544,952.
Notification of Transmittal of the International Search Report and the Written Opinion of the International Searching Authority issued May 2, 2006 in International Application No. PCT/US2006/017127.
Notification of Transmittal of the International Search Report and the Written Opinion of the International Searching Authority issued Sep. 29, 2008 in International Application No. PCT/US2008/055420.
Notification of Transmittal of the International Search Report and the Written Opinion of the International Searching Authority issued Sep. 4, 2008 in International Application No. PCT/US2008/059648.
Co-pending U.S. Appl. No. 12/495,243, titled Airbag Mounting Assemblies With Double-Locking Wrappers, filed Jun. 30, 2009.
Co-pending U.S. Appl. No. 12/689,813, titled Double-Sewn Airbag Mounting Assemblies, filed Jan. 19, 2010.
Co-pending U.S. Appl. No. 12/544,952, titled Inflatable Airbag Assemblies With Alignment Apertures, filed Aug. 20, 2009.

Co-pending U.S. Appl. No. 12/507,699, titled Inflatable Airbag Assemblies With Modular Components and Related Methods of Manufacture, filed Jul. 22, 2009.

Notice of Allowance and Fee(s) Due mailed Apr. 18, 2011 in co-pending U.S. Appl. No. 12/495,243, now issued as U.S. Patent No. 7,980,585.

Amendment and Response filed May 4, 2011 in co-pending U.S. Appl. No. 12/544,952, now published as U.S. Publication No. US 2011/0042923.

Final Office Action mailed Jun. 27, 2011 in co-pending U.S. Appl. No. 12/544,952, now published as U.S. Publication No. US 2011/0042923.

Amendment and Response filed Apr. 18, 2011 in co-pending U.S. Appl. No. 12/507,699, now published as U.S. Publication No. US 2011/0018245.

Notice of Allowance mailed Jun. 27, 2011 in co-pending U.S. Appl. No. 12/507,699, now published as U.S. Publication No. US 2011/0018245.

Amendment and Response to Office Action filed Mar. 31, 2011 in co-pending U.S. Appl. No. 12/495,243, now published as U.S. Publication No. US 2010/0327564.

Office Action mailed Nov. 4, 2010 in co-pending U.S. Appl. No. 12/544,952, now published as U.S. Publication No. US 2011/0042923.

Notification of Transmittal of the International Search Report and the Written Opinion of the International Searching Authority issued Mar. 14, 2011 in International Application No. PCT/US2011/021662.

Office Action mailed Oct. 1, 2010 in co-pending U.S. Appl. No. 12/495,243, now published as U.S. Patent Application Publication No. US 2010/0327564.

Office Action mailed Oct. 18, 2010 in co-pending U.S. Appl. No. 12/507,699.

Notification of Transmittal of the International Search Report and the Written Opinion of the International Searching Authority issued Oct. 26, 2010 in International Application No. PCT/US2010/047258.

Notification of Transmittal of the International Search Report and the Written Opinion of the International Searching Authority issued Oct. 20, 2010 in International Application No. PCT/US2010/046113.

Amendment and Response to Final Office Action filed Aug. 29, 2011 in co-pending U.S. Appl. No. 12/544,952, now published as U.S. Publication No. US 2011/0042923.

Notice of Allowance and Fee(s) Due mailed Sep. 13, 2011 in co-pending U.S. Appl. No. 12/544,952, now published as U.S. Publication No. US 2011/0042923.

Notice of Allowance and Fee(s) Due mailed Oct. 18, 2011 in co-pending U.S. Appl. No. 12/689,813, now issued as U.S. Patent No. 8,091,918.

* cited by examiner

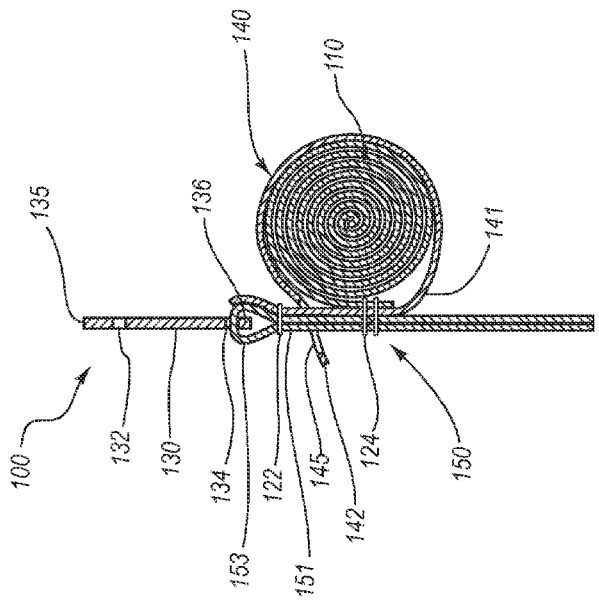
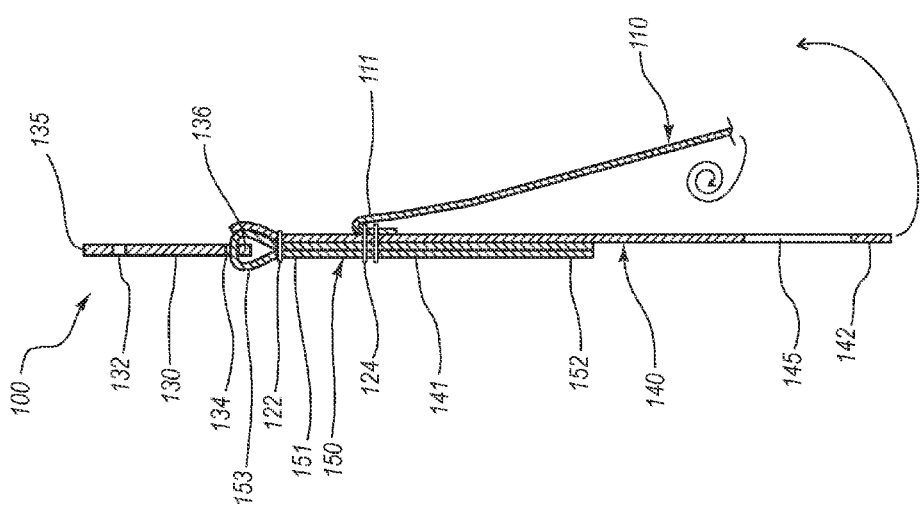

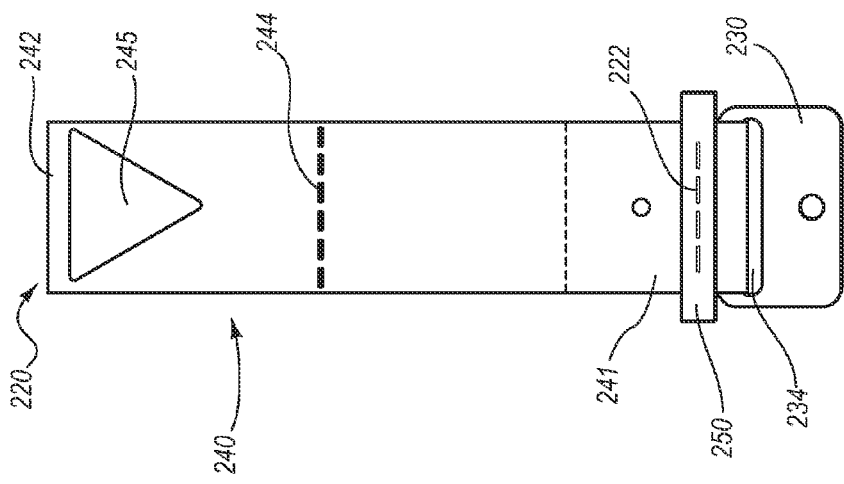
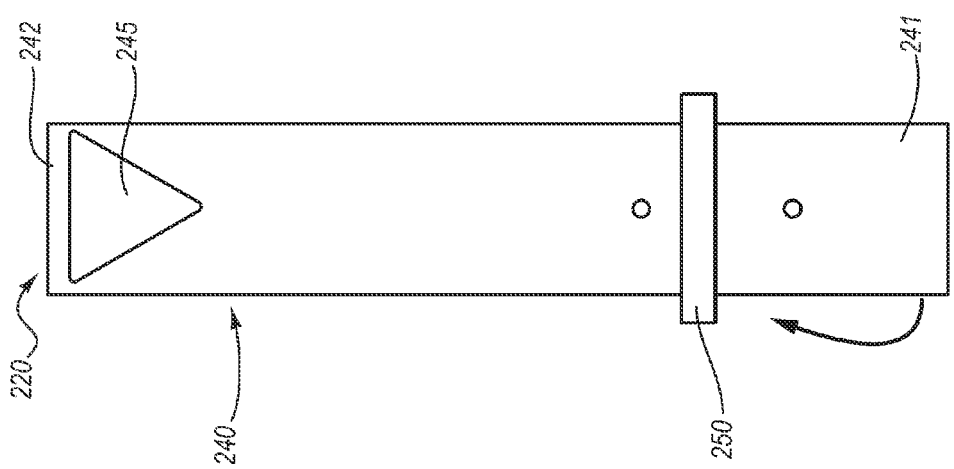

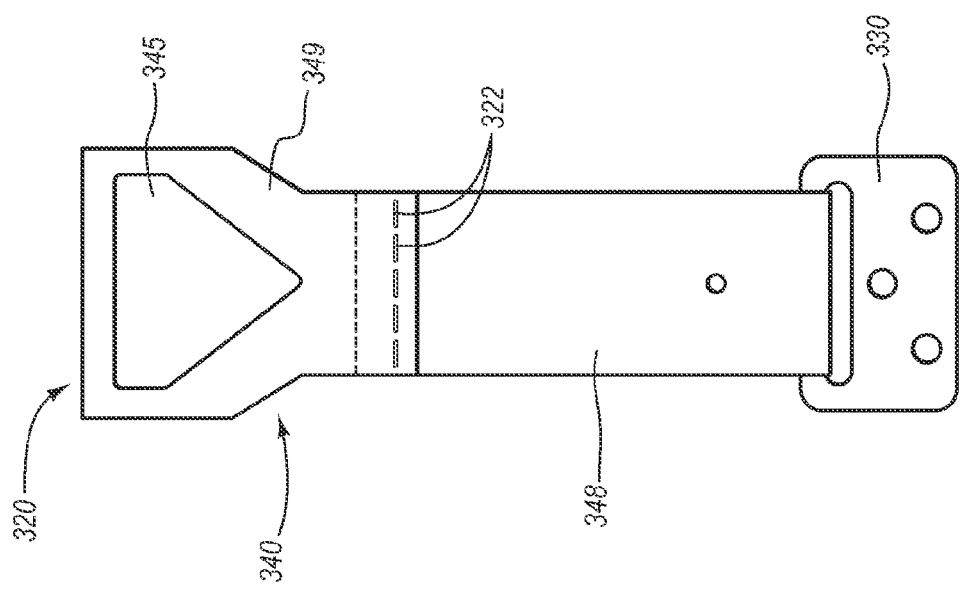

MOUNTING ASSEMBLIES WITH WRAPPERS FOR INFLATABLE CURTAIN AIRBAGS

TECHNICAL FIELD

The present disclosure relates generally to the field of automotive protective systems. More specifically, the present disclosure relates to inflatable curtain airbag mounting assemblies with wrapping members.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 4A is a cross sectional view of the airbag assembly of FIG. 1A before the airbag has been rolled and wrapped.

FIG. 4B is a cross sectional view of the airbag assembly of FIG. 4A after the airbag has been rolled and wrapped.

FIG. 5A is a front elevation view of another embodiment of a mounting assembly, wherein the mounting assembly has not yet been assembled.

FIG. 5B is a front elevation view of the mounting assembly of FIG. 5A after the mounting assembly has been assembled.

FIG. 6 is a front elevation view of another embodiment of an airbag mounting assembly.

DETAILED DESCRIPTION OF PREFERRED EMBODIMENTS

Figure 1A:
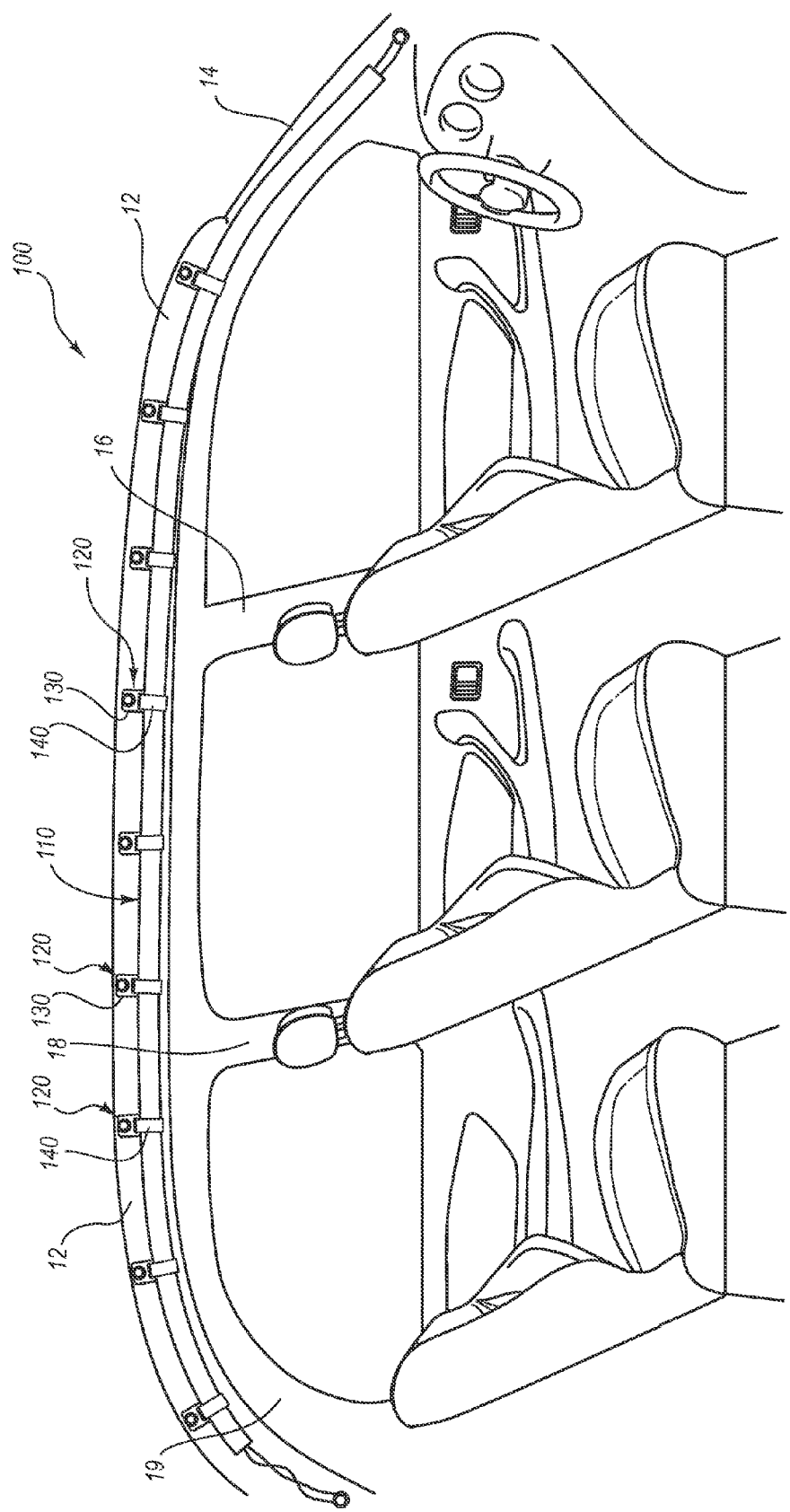
FIG. 1A is a perspective view of one embodiment of an airbag assembly, wherein the airbag assembly comprises a mounting assembly that is coupled to an airbag, wherein the mounting assembly is configured to retain the airbag in a packaged configuration.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over event. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of side windows and a B-pillar of the vehicle. In some embodiments, inflatable curtain airbags may extend from an A-pillar to a C-pillar of the vehicle. In alternative embodiments, inflatable curtain airbags may extend from the A-pillar to a D-pillar of the vehicle.

Inflatable curtain airbags are typically installed adjacent to the roof rail of a vehicle in an undeployed state, in which the inflatable curtain airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. When extended and inflated, the airbag may be said to comprise a deployed configuration. Thus, an airbag mounting apparatus typically allows for a secure connection between the vehicle and the airbag, yet allows the airbag to change configurations from the packaged configuration to the deployed configuration.

FIG. 1A depicts airbag assembly 100 from a perspective view, wherein a mounting assembly 120 is coupled to an inflatable airbag cushion 110 that is in a packaged configuration, and is mounted adjacent a vehicle roof rail 12. Airbag assembly 100 may comprise an airbag mounting assembly 120 and an inflatable airbag cushion 110. A plurality of mounting assemblies 120 may be employed to couple cushion 110 to a vehicle. Mounting assembly 120 may comprise a mounting bracket 130, a wrapping member 140, and a connecting member (not visible). Mounting assembly 120 may be employed to couple airbag 110 adjacent to a vehicle roof rail 12 or other vehicle structure. As such, mounting assembly may be said to be a portion of an airbag assembly, which may comprise an inflatable airbag cushion and a mounting assembly. The airbag assembly may further comprise an inflator. In the depicted embodiment, airbag 110 is an inflatable curtain airbag cushion, which extends from an A-pillar 14 to a D-pillar 19. Cushion 110 also extends past a B-pillar 16 and a C-pillar 18 such that in a deployed configuration, the cushion at least partially covers the B- and C-pillars, as depicted in FIG. 1B.

Figure 1B:
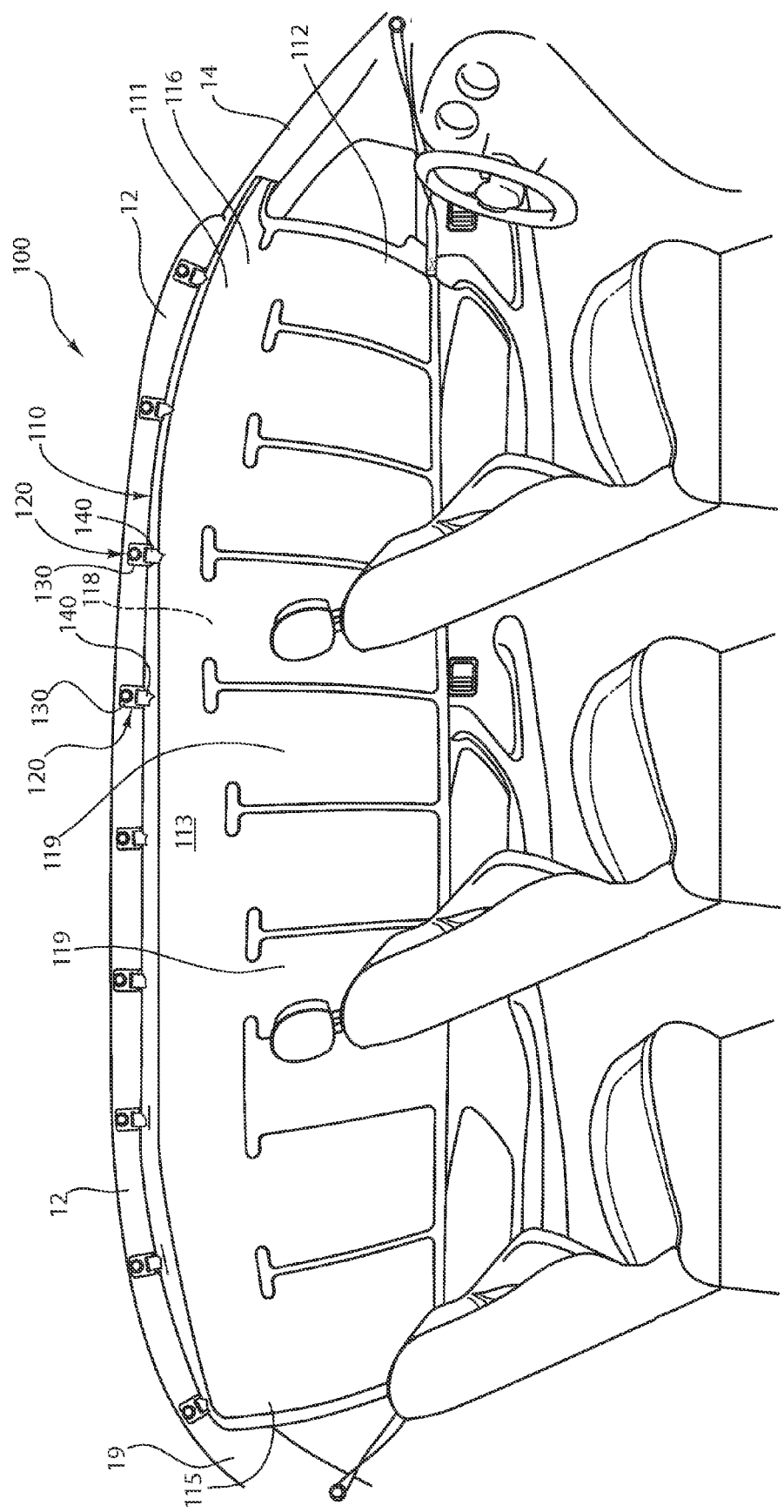
FIG. 1B is a perspective view of the airbag assembly of FIG. 1A, wherein the airbag is in a deployed configuration.

FIG. 1B is a perspective view of mounting assembly 120, wherein cushion 110 is depicted in a deployed configuration. Cushion 110 is configured to become inflated upon activation of one or more inflators such that the cushion transitions from the packaged configuration to the deployed configuration. During deployment, wrapping member 140 is configured to rupture such that cushion 110 can adopt the deployed configuration. Cushion 110 may be described as having an upper portion 111, a lower portion 112, a front face 113, a rear face (not visible) a first side 115, and a second side 116. The various faces of cushion membrane 110 define an interior inflatable void 118, which is in fluid communication with an inflator (not visible). Inflatable void 118 may be divided into inflation cells 119. The various faces of cushion 110 may comprise panels of a woven nylon fabric that are coupled together at a seam.

Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

Upon activation, the inflator rapidly generates and/or releases inflation gas, which rapidly inflates the cushion. The inflator may be one of several types, such as pyrotechnic, stored gas, or a combination inflator and may comprise a single or multistage inflator. As cushion 110 becomes inflated, tension is applied to wrapping member 140, which causes the wrapping member to cease to retain the cushion in the packaged configuration.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable curtain cushion; a rear passenger side airbag; a driver's airbag; and/or a front passenger airbag. Also, the cushion membrane may comprise on or more of any material well known in the art, such as a woven nylon fabric. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2:
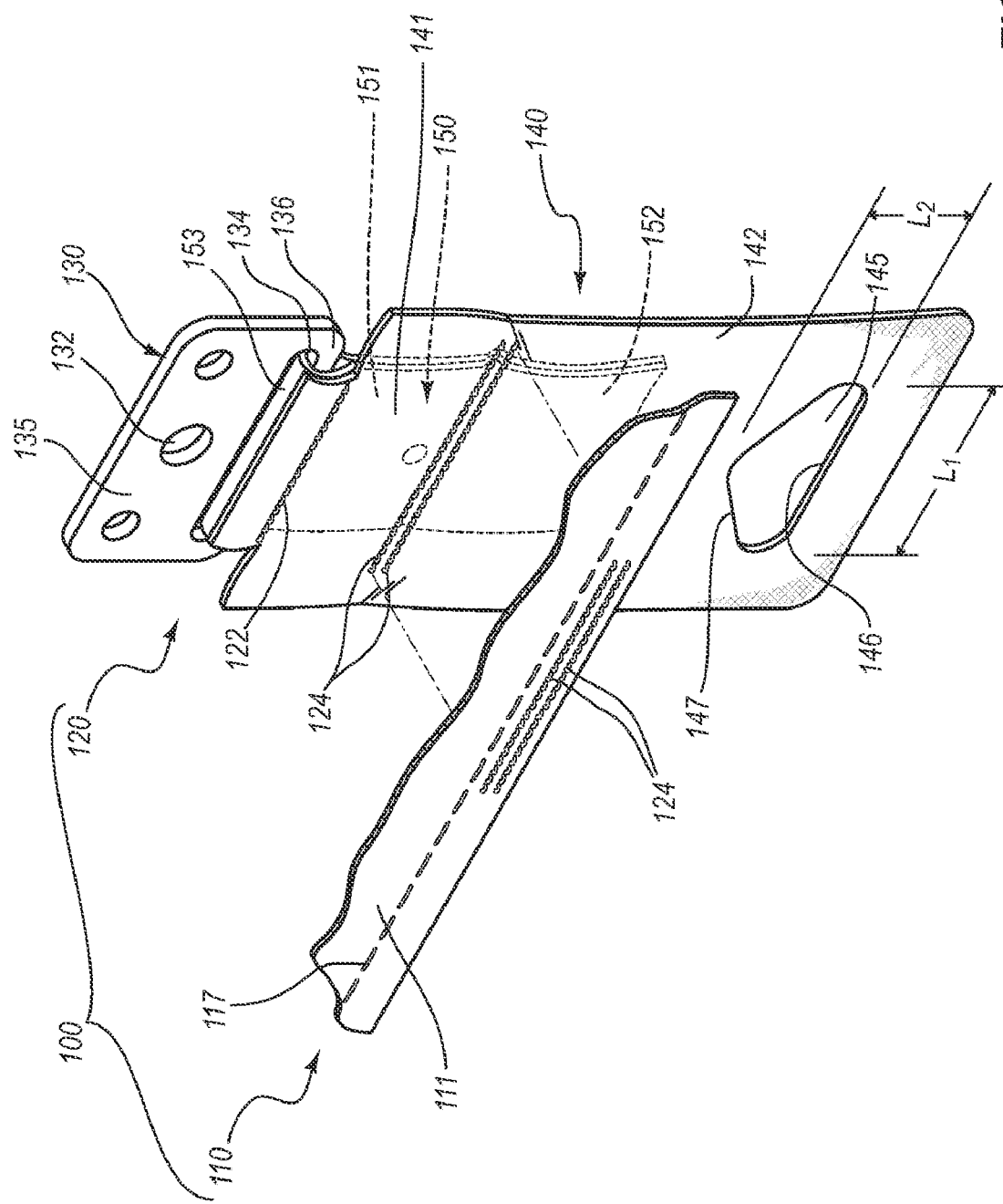
FIG. 2 is a partially exploded perspective view of the airbag assembly of FIG. 1A, wherein the airbag has been cutaway.

FIG. 2 depicts airbag assembly 100 from a partially exploded perspective view, in which inflatable airbag cushion 110 is partially cutaway. Mounting assembly 120 may comprise bracket 130, wrapping member 140, and a connecting member 150. Bracket 130 may comprise a top portion 135 and a bottom portion 136. Bracket 130 may also comprise a mounting aperture 132 that is located on the top portion, and a receiving aperture 134 that is located nearer the bottom portion than the mounting aperture. Mounting aperture 132 is configured to receive a fastener, such as a mounting structure coupled to the vehicle, or a bolt. Receiving aperture 134 is configured to receive connecting member 150. Receiving aperture 134 may be described as an elongated slot. One skilled in the art will recognize that the bracket may comprise more or fewer apertures than described herein. For example, in one embodiment, the bracket comprises two mounting apertures, and in another embodiment, the bracket comprises three mounting apertures. Further, the location of the apertures may vary from the depiction of FIG. 2.

Wrapping member 140 may comprise a substantially elongated piece of a material that has a first portion 141 and a second portion 142. The material of wrapping member 140 may comprise a non-woven nylon frangible material or a non-woven polyester frangible material (e.g., a frangible plastic film), a non-frangible material that has a rupture point, or a closure mechanism or material that is configured to fail during inflatable curtain airbag 110 deployment. First portion 141 may be coupled to connecting member 150 via stitching 122. First portion 141 may also be coupled to inflatable curtain airbag 110 via stitching 124.

Second portion 142 of wrapping member 140 may comprise an opening 145. Opening 145 is configured to allow second portion 142 of wrapping member 140 to fit over bracket 130 and thereby retain an airbag cushion in a rolled and/or folded configuration. As such, a total length of wrapping member 140 is of a predetermined magnitude. In the depicted embodiment, opening 145 is defined by a rim with a triangular shape that comprising a base 146 and an apex 147, wherein a length $L_1$ of the base may be in a range from about 30 mm to about 50 mm and a length $L_2$ from base 146 to apex 147 may be in a range from about 10 mm to about 30 mm. One skilled in the art will recognize that the dimensions of the aperture may be varied for use with different sized mounting brackets.

In the depicted embodiment, a total width of wrapping member 140, as measured parallel with base, 146 may be in a range from about 50 mm to about 80 mm; however, as one skilled in the art will recognize, the total width of the wrapping member may be varied for use with different sized mounting brackets and/or so that the wrapping member will rupture when exposed to a predetermined magnitude of tension. Opening 145 may comprise a cutout portion of wrapping member 140. One skilled in the art will recognize that the shape and dimensions of the wrapping member and opening may vary from the depicted embodiment and associated description without departing from the spirit of this disclosure.

Connecting member 150 may comprise a non-frangible material, such as a woven nylon material, or any other suitable material that is known in the art. Connecting member 150 is configured to be received by, and protrude through, receiving aperture 134. Connecting member 150 may comprise a rectangular piece of material that can be folded over to form a loop 153, which can surround bottom portion 136 of mounting bracket 130. First portion 151 may be coupled to itself to fixedly attach connecting member 150 to mounting bracket 130 via loop 153. First portion 151 may be coupled to itself via stitching 122. Connecting member 150 may be coupled to inflatable curtain airbag 110 via stitching 124.

For clarity, cushion 110 is partially cutaway in FIG. 2. Top portion 111 of cushion 110 may be coupled to mounting assembly 120 at first portion 141 of wrapping member 140. Cushion 110 may be coupled to the assembly at a non-inflatable portion, such as the area outside of seam 117. The cushion may be coupled to mounting assembly 120 via stitching 124, which may comprise a separate set of stitching than stitching 122. During manufacture, mounting assembly 120 may be produced independent of inflatable curtain 110 such that the cushion is coupled to mounting assembly 120 after the mounting assembly has been produced. As such, mounting assembly 120 may be described as being a sub-assembly 120 of inflatable curtain airbag assembly 100.

Figure 3A:
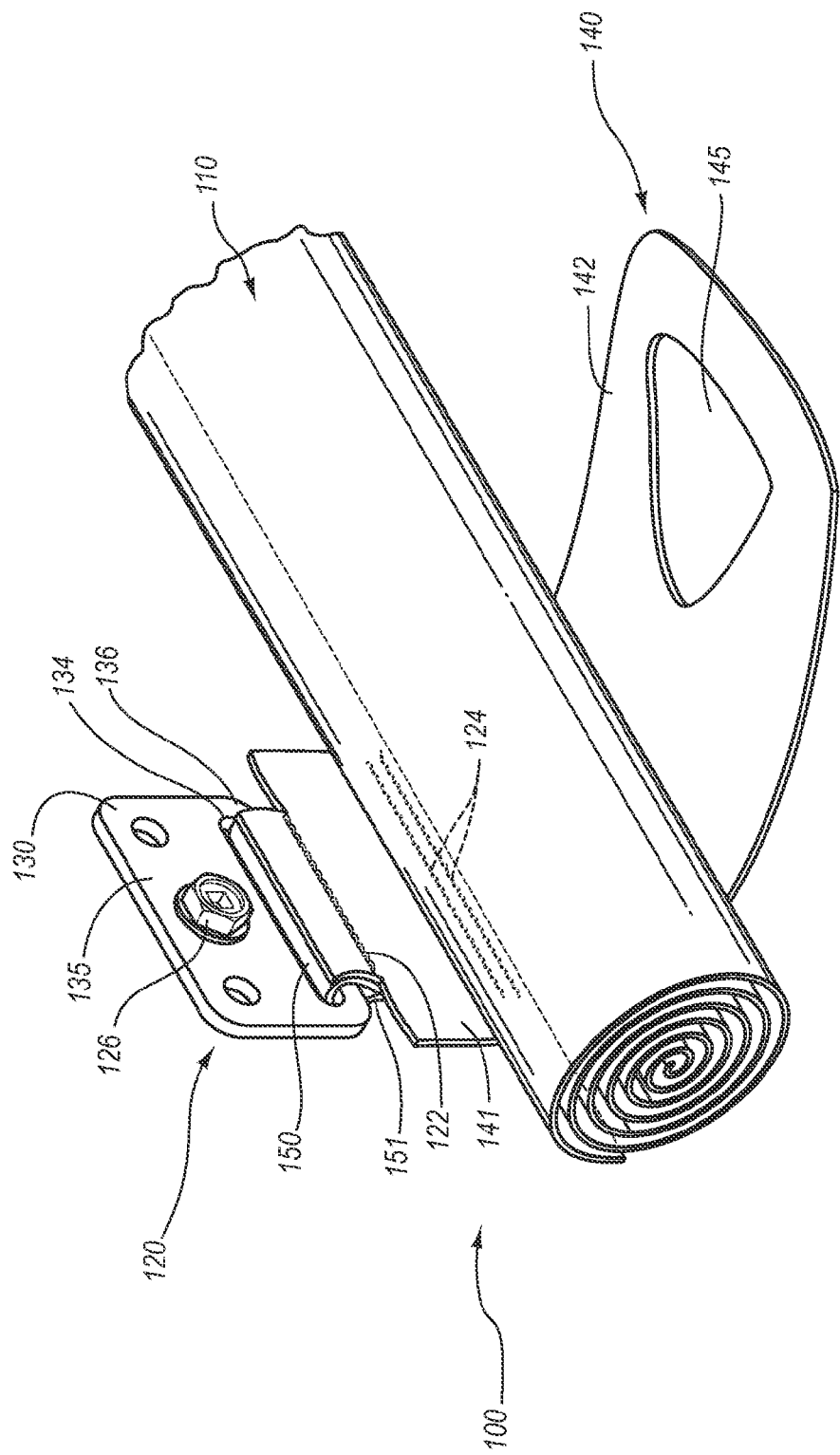
FIG. 3A is a cutaway perspective view of the airbag assembly of FIG. 1A, wherein the airbag has been rolled, but has not yet been wrapped.

FIG. 3A is a perspective view of airbag assembly 100, wherein cushion 110 has been partially cutaway. In the depiction of FIG. 3A, cushion 110 is in a rolled configuration and has been coupled to mounting assembly 120 at first portion 141 of wrapping member 140 via stitching 124. In the rolled configuration, cushion 110 comprises an outside surface, which may be circular or oval in shape, when viewed from an end. Bracket 130 is depicted as having a bolt 126 projecting into and through the bracket mounting aperture, which is located on top portion 135 of the bracket. Receiving aperture 134 is located on bottom portion 136 of bracket 130 and is depicted as having received first portion 151 of the connecting member 150. Stitching 122 couples first portion 151 to itself such that the connecting member is attached to mounting bracket 130. Wrapping member 140 may be coupled to connecting member 150 at first portion 141 of the wrapping member via stitching 122. Also, wrapping member 140 may be coupled to cushion 110 via stitching 124. Second portion 142 of connecting member 140 comprises an opening 145.

Figure 3B:
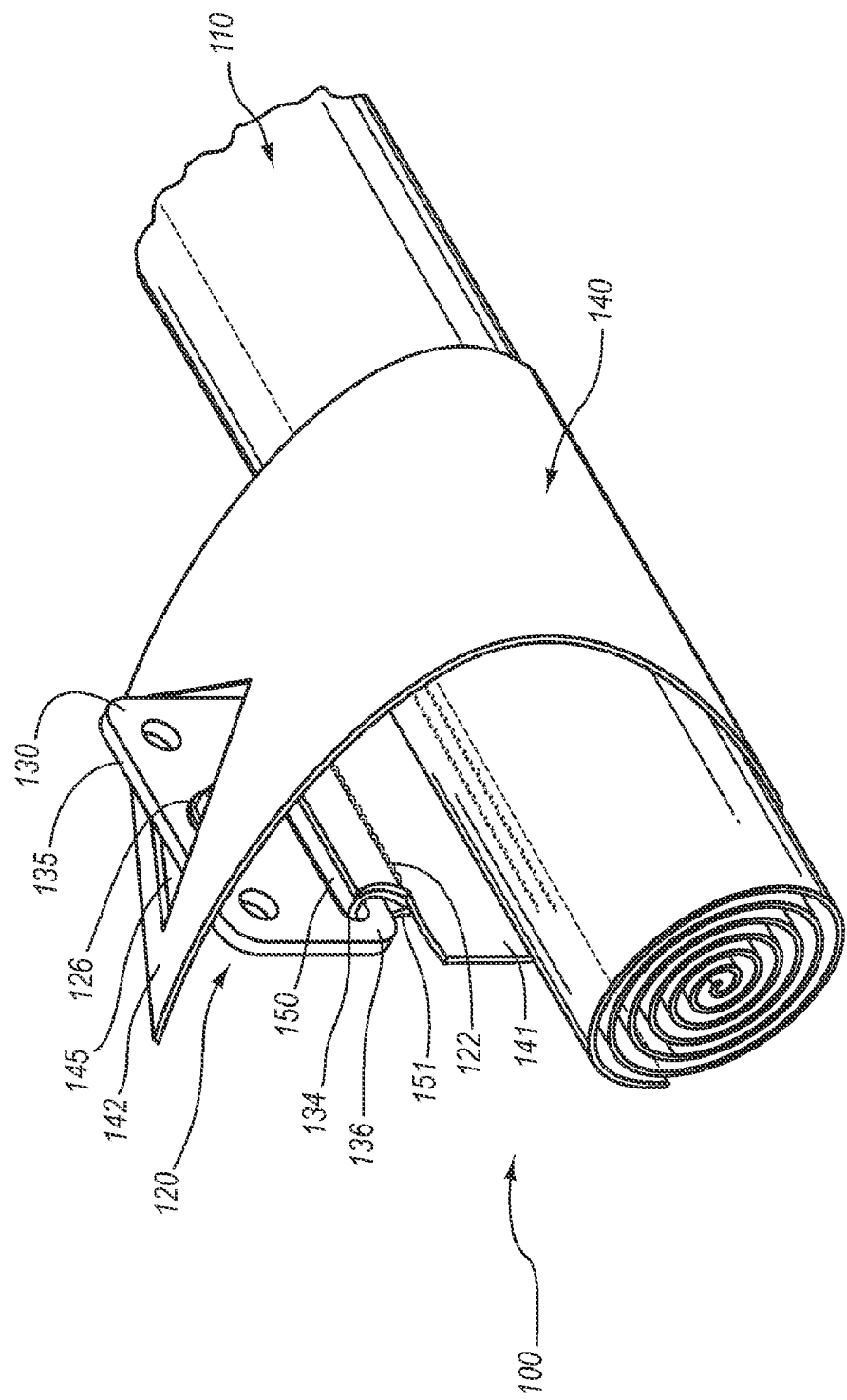
FIG. 3B is a cutaway perspective view of the airbag assembly of FIG. 3A, wherein a wrapping member of the mounting assembly is being wrapped around the airbag.

FIG. 3B is a cutaway perspective view of airbag assembly 100 of FIG. 3A after wrapping member 140 has been wrapped around cushion 110 and is being coupled to mounting bracket 130. Second portion 142 of wrapping member 140 may be directed toward bracket 130 such that cushion 110 is wrapped. Opening 145 is configured to fit over bracket 130, and in the depiction of FIG. 3B, the opening has partially received top portion 135 of the bracket. To fully receive bracket 130, second portion 142 continues to be directed toward bottom portion 136 of the bracket, first portion 151 of connecting member 150, and first portion 141 of the wrapping member.

Figure 3C:
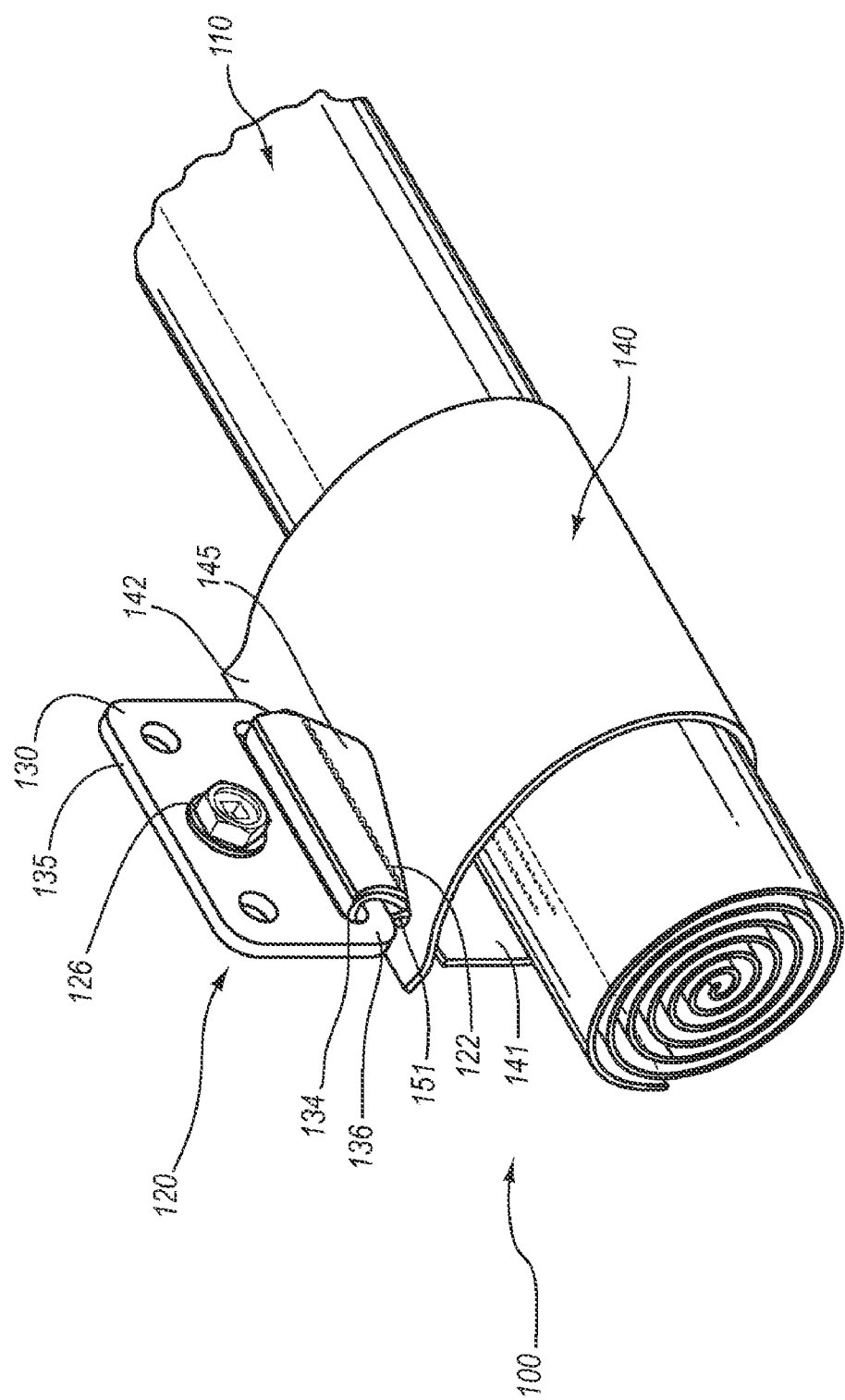
FIG. 3C is a cutaway perspective view of the airbag assembly of FIG. 3b, wherein the airbag has been wrapped by a wrapping member.

FIG. 3C is a cutaway perspective view of airbag assembly 100 of FIG. 3B after cushion 110 has been wrapped and retained in a rolled and/or folded configuration such that the cushion comprises a packaged configuration. Opening 145 of second portion 142 has fully received mounting bracket 130 and has been positioned between bottom portion 136 of the bracket and first portion of wrapping member 140. Opening 145 also partially receives first portion 151 of the connecting member. As such, first and second portions 141 and 142 have been coupled adjacent to each other and wrapping member 140 may be said to be wrap cushion 110. Also, wrapping member 140 may be said to circumnavigate cushion 110. During airbag deployment the cushion may become partially inflated, which may transmit tension to the wrapping member such that the wrapping member ruptures.

FIGS. 4A and 4B are cross sectional views of airbag assembly 100, wherein FIG. 4A depicts the assembly before the cushion has been rolled and wrapped and FIG. 4B depicts the assembly in the packaged configuration. Mounting bracket 130 comprises top portion, which has mounting aperture 132, and bottom portion 136, which has receiving aperture 134. Upper portion 111 of cushion 110 is coupled to first portion 141 of wrapping member 140 via stitching 124. First and second portions 151 and 152 of connecting member 150 may each comprise two layers of material. First portion 151 is depicted as forming a loop 153 that is closed via stitching 122, such that connecting member 150 is attached to mounting member 130.

In the depiction of FIG. 4A, cushion 110 is in an extended non-deployed configuration such as during manufacture and incorporation into an airbag assembly. Wrapping member 140 is also in an extended configuration, wherein second portion 142 is not adjacent to first portion 141 and opening 145 is not placed over mounting bracket 130.

In the depiction of FIG. 4B, airbag assembly 100 is in the packaged configuration. Wrapping member 140 has been wrapped around an outer surface of rolled cushion 110 and opening 145 in second portion 142 has been placed over bracket 130, and over loop 153 of first portion 151 of connecting member 150, and on first portion 141 of the wrapper.

As such, the cushion is retained in the rolled configuration via wrapping member 140. Opening 145 may be located between bottom portion 136 of mounting bracket 130 and stitching 124. Second portion 142 is adjacent to first portion 141 and surrounds first portion 151 of connecting member 150.

FIGS. 5A-5B depict another embodiment of a mounting assembly 220, wherein FIG. 5A depicts some components of the assembly during manufacture and FIG. 5B depicts the assembly after manufacture. In the depicted embodiment, assembly 220 does not comprise a separate connecting member and wrapping member. Instead, wrapping member 240 comprises a connecting member. Wrapping member 240 comprises a non-frangible material that is rendered frangible via a rupture point 244, as depicted in FIG. 5B. First portion 241 of wrapping member 240 may comprise a greater length than a finished length, wherein the first portion can be folded one or more times to achieve the finished length. During manufacture, first portion 241 may be threaded through receiving aperture 234 of bracket 230, folded over the bracket, and sewn together via stitching 222.

Prior to sewing, a lug 250 may be placed between the layers of the folded wrapping member, or alternatively, the lug may be sewn on the outside of the wrapping member, rather than between the wrapping member layers. Lug 250 may comprise one or more pieces of fabric or other material. In the depicted embodiment, lug 250 comprises a piece of material that is separate from wrapping member 240 and is coupled to wrapping member 240 via stitching 222. In another embodiment, the lug comprises an extension of wrapping member 240. Lug 250 is located in a predetermined position such that when assembly 220 is in a packaged configuration with an inflatable curtain airbag, opening 245 is located between lug 250 and mounting bracket 230. Lug 250 prevents wrapper 240 from tightening or "creeping" on the airbag. As such, the lug may be described as being a "stop".

Prior to, or after bracket 230 and lug 250 are coupled to wrapping member 240, perforations 244 may be formed in the wrapping member to form the rupture point 244. Likewise, prior to or after the steps described herein, opening 245 may be formed in second portion 242. Mounting assembly 220, as depicted in FIG. 5B, may be described as comprising a sub-assembly, wherein in the depiction, the sub-assembly is ready to be coupled to an inflatable airbag cushion. Mounting assembly 220 is configured to function similarly to mounting assembly 120, described herein. Opening 245 is configured to function similarly as opening 245, described herein, such that it may fit over mounting bracket 230 and thereby retain an inflatable curtain airbag assembly in a packaged configuration.

FIG. 6 depicts another embodiment of a mounting assembly 320 from a front elevation view. Assembly 320 may be configured similarly and may function similarly as assembly 120 and assembly 220, described herein. Assembly 320 may comprise a mounting bracket 330 and a wrapping member 340. In the depicted embodiment, wrapping member 340 has an asymmetric, substantially rectangular shape, wherein the wrapping member comprises a first piece of material 348 and a second piece of material 349. First and second pieces of material 348 and 349 comprise non-frangible materials that are coupled together via tear stitching 322. First piece of material 348 may be described as a connecting member, which may be configured similarly as and may function similarly to connecting member 150, described herein. During deployment, tear stitching 322 is configured to rupture such that an inflatable airbag cushion coupled to mounting assembly can change configurations from a packaged state to a deployed state. As such, tear stitching 322 may function similarly as rupture point 244, described herein.

Opening 345 may be located on second piece of material 349, and may comprise a pentagonal shape, as depicted in FIG. 6. Opening 345 is configured to function similarly as opening 145, described herein, such that it may fit over mounting bracket 330. Bracket 330 may comprise one or more mounting apertures and a receiving aperture for receiving first piece of material 348 of wrapping member 340. One skilled in the art will appreciate that the relative sizes of the first and second pieces of materials depicted in FIG. 6 are for illustrative purposes only and may vary.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag mounting assembly, comprising:
a mounting bracket having an aperture, wherein the mounting bracket is configured to be mounted to a vehicle structure;
a connecting member that protrudes through the aperture in the mounting bracket; and
a wrapping member having an aperture, wherein the wrapping member is configured to wrap around a portion of an inflatable airbag cushion and to be coupled to the mounting bracket to retain the inflatable airbag cushion in a packaged configuration,
wherein in the packaged configuration, the mounting bracket protrudes through the aperture in the wrapping member.

2. The mounting assembly of claim 1, wherein the wrapping member is configured to rupture during inflatable airbag deployment, such that the wrapping member ceases to retain the inflatable airbag cushion in the packaged configuration.

3. The mounting assembly of claim 2, wherein the wrapping member has a rupture point to facilitate rupturing during inflatable airbag cushion deployment.

4. The mounting assembly of claim 2, wherein the rupture point of the wrapping member comprises perforations.

5. The mounting assembly of claim 2, wherein the wrapping member comprises a frangible material.

6. The mounting assembly of claim 5, wherein the frangible material comprises a non-woven fabric.

7. The mounting assembly of claim 6, wherein the frangible material comprises a plastic film.

8. The mounting assembly of claim 2, wherein the wrapping member comprises two pieces of material.

9. The mounting assembly of claim 8, wherein the two pieces are coupled together using tear stitching.

10. The mounting assembly of claim 8, wherein one of the pieces of material comprises a frangible material.

11. The mounting assembly of claim 1, wherein the mounting bracket comprises a metal planer member, and wherein the aperture comprises a receiving aperture and is configured as an elongated slot, and wherein the mounting bracket also has a mounting aperture that is configured to receive a bolt.

12. The mounting assembly of claim 11, wherein the connecting member comprises a non-frangible material, the connecting member being configured to protrude through the receiving aperture of the mounting bracket such that a loop is formed in the connecting member and the loop is retained via stitching, thereby attaching the connecting member to the mounting bracket, and
wherein the connecting member is coupled to the wrapping member via the same stitching that retains the loop of the connecting member.

13. The mounting assembly of claim 1, wherein the wrapping member comprises a connecting member and is coupled to the mounting bracket by passing through the aperture in the mounting bracket.

14. An airbag mounting assembly, comprising:
a mounting bracket having an aperture, where in the mounting bracket is configured to be mounted to a vehicle structure and coupled to an inflatable airbag cushion;
a connecting member comprising a first portion and a second portion, wherein the first portion of the connecting member forms a loop that couples the connecting member to the mounting bracket by extending through the aperture in the mounting bracket; and
a wrapping member that is attached to the connecting member via stitching, wherein the wrapping member comprises a first portion and a second portion, and wherein the second portion comprises a mounting bracket receiving aperture that is configured to allow the mounting bracket to pass through the mounting bracket receiving aperture.

15. The mounting assembly of claim 14, wherein the first portion of the connecting member is coupled to the connecting member via stitching.

16. The mounting assembly of claim 14, wherein mounting assembly comprises a rupture point that is located at a predetermined position on the wrapping member and is configured such that during airbag deployment, the wrapping member ruptures at the rupture point, thereby allowing the inflatable airbag cushion to adopt a deployed configuration.

17. The mounting assembly of claim 14, wherein mounting assembly comprises a rupture point that is located at a predetermined position on the connecting member and is configured such that during airbag deployment, the connecting member ruptures at the rupture point, thereby allowing the inflatable airbag cushion to adopt a deployed configuration.

18. The mounting assembly of claim 14, wherein mounting assembly comprises a rupture point that is located at a connecting point of the connecting member and the wrapper, and wherein the rupture point comprises tear stitching that is configured to rupture during airbag deployment, thereby allowing the inflatable airbag cushion to adopt a deployed configuration.

19. The mounting assembly of claim 14, wherein in a packaged configuration, the inflatable airbag cushion comprises a rolled configuration, the wrapping member wraps around the inflatable airbag cushion, and the aperture in the second portion of the wrapping member surrounds a portion of the first portion of the wrapping member and a portion of the connecting member.

20. The mounting assembly of claim 14, wherein the mounting assembly further comprises a lug that is coupled to the first portion of the wrapping member.

21. The mounting assembly of claim 20, wherein in a packaged configuration, the aperture in the first portion of the wrapping member is located between a bottom portion of the mounting bracket and the lug.

22. The mounting assembly of claim 21, wherein the lug comprises a piece of fabric.

23. The mounting assembly of claim 20, wherein the lug is coupled to the wrapping member by the stitching that couples the first portion of the wrapping member to the wrapping member.

24. The mounting assembly of claim 14, wherein the aperture in the second portion of the wrapping member comprises a base and an apex that opposes the base.

25. The mounting assembly of claim 24, wherein the aperture defines a triangular shape.

26. The mounting assembly of claim 24, wherein the aperture in the second portion of the wrapping member is pentagonal.

27. The mounting assembly of claim 14, wherein the wrapping member comprises one mounting bracket receiving aperture.

* * * * *